May 2, 1961   D. C. EISENDRATH   2,982,451
DECANTER
Filed Sept. 3, 1957
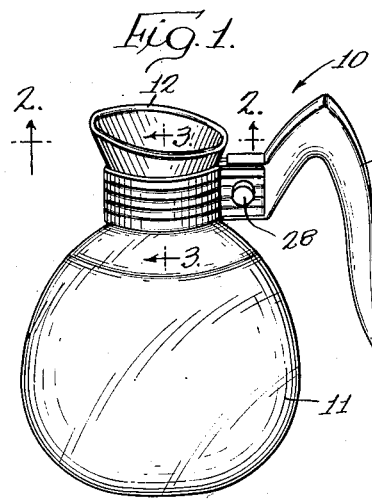
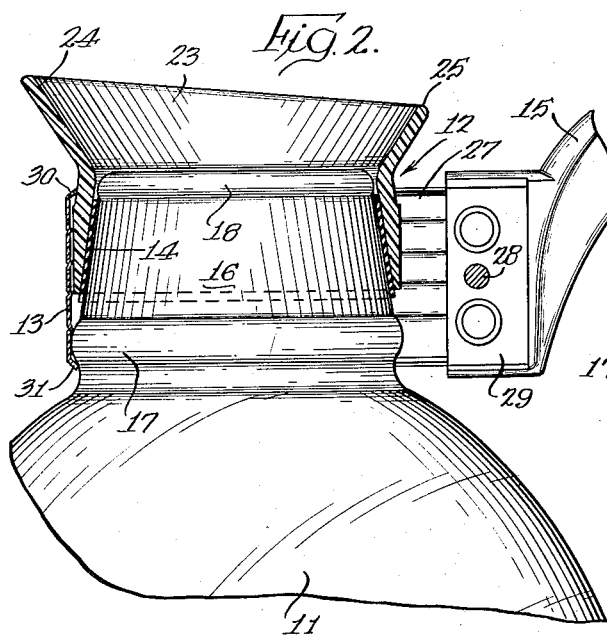
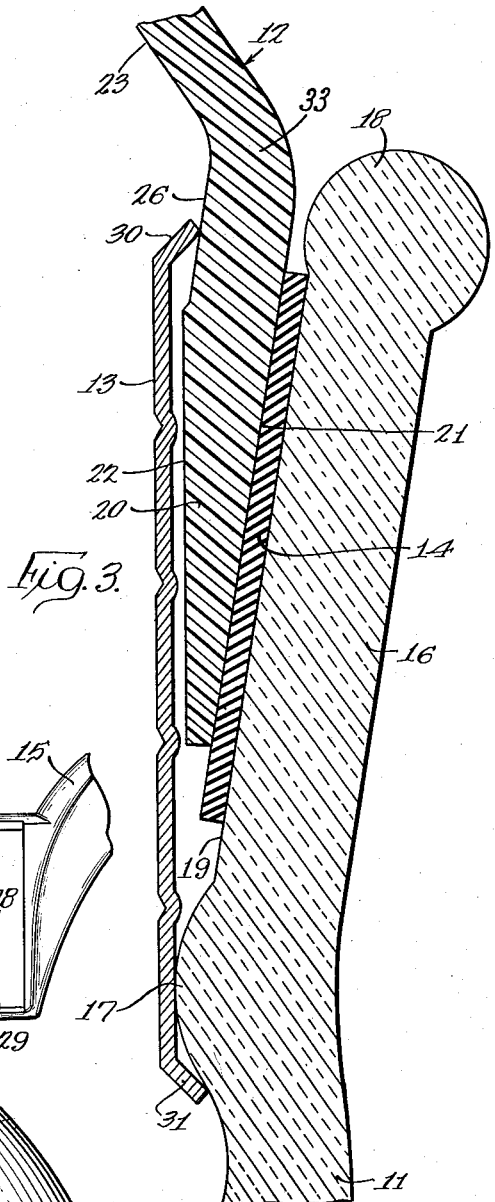
INVENTOR.
David C. Eisendrath

United States Patent Office 2,982,451
Patented May 2, 1961

2,982,451

DECANTER

David C. Eisendrath, Chicago, Ill., assignor to Cory Corporation, a corporation of Delaware Filed Sept. 3, 1957, Ser. No. 681,506

3 Claims. (Cl. 222—566)

This invention relates to a liquid pouring means and in particular to a pouring spout for use in a decanter.

A serious problem has been found to arise in the use of conventional glass beverage decanters, namely that the pouring lip, because of repeated bumping, tends to crack and chip due to the frangible nature of the glass. While rolling or beading the rim of the outlet has to a limited extent alleviated the problem, cracking and breaking of the rim of such decanters remains a serious problem.

The principal object of this invention is to provide a new and improved liquid pouring means for use in a decanter.

Another object is to provide such a pouring means formed of a non-frangible material and arranged to be sealingly mounted on the upright outlet of the decanter vessel.

A further object is to provide such a pouring means including a tubular spout secured to the vessel outlet by means of a retaining ring having an outer inturned end engaging a radially outer frusto-conical sufrace on the spout and an inner inturned end hooking under a bead on the outlet.

Still another object of the invention is to provide such a liquid pouring means wherein the retaining ring comprises means for securing the handle to the vessel.

Yet another object is to provide a new and improved liquid pouring means for use with a decanter vessel having a frusto-conical upwardly narrowing outlet, wherein the spout of the pouring means is provided with a complementary radially inner frusto-conical surface.

A yet further object is to provide such a liquid pouring means including a spout wherein the outer frusto-conical surface of the spout engaged by the ring outer end is parallel to the frusto-conical inner surface of the spout whereby the spout may be positioned longitudinally of the outlet so as to maintain the radius of the line of contact between the outer inturned end and the outer frusto-conical surface, regardless of the deviation of the radius of the outlet from a desired nominal radius.

Yet another object is to provide such a liquid pouring means wherein the retaining ring comprises a cylindrical element and the internal radii of the inturned ends are equal, and the parallel relationship of the outer frusto-conical portion and the inner frusto-conical surface of the spout maintains the engaged portion of the spout at the radius of the engaged portion of the outlet and precludes a deformation of the retaining ring from a configuration substantially parallel to the axis thereof.

Other features and advantages of this invention will be apparent from the following description taken in connection with the accompanying drawings wherein:

Fig. 1 is an isometric view of a decanter having a liquid pouring means embodying the invention associated therewith;

Fig. 2 is an enlarged fragmentary vertical section taken approximately along the line 2—2 of Fig. 1; and Fig. 3 is a more greatly enlarged fragmentary vertical section taken approximately along the line 3—3 of Fig. 1.

In the exemplary embodiment of the invention as disclosed in the drawings, a pouring means generally designated 10 is mounted on the glass bowl or vessel 11 of a beverage dispensing decanter. The pouring means comprises a generally tubular spout 12, a retaining ring 13 and a sealing sleeve 14. Ring 13 may also serve to attach a handle 15 to vessel 11 for carrying and manipulating the decanter.

The portion of vessel 11 to which pouring means 10 is secured, comprises a generally tubular, upright outlet 16. An annular, radially outwardly projecting bead 17 is provided on outlet 16 for cooperation with retaining ring 13 to lock spout 12 in place on the outlet.

Reference now being had more specifically to Figs. 2 and 3, outlet 16 comprises a frusto-conical, upwardly narrowing projection of vessel 11. The outer or upper end 18 of the outlet may be rolled to provide a smooth edge. Bead 17 is spaced a substantial distance below end 18 whereby the frusto-conical radially outer surface 19 of outlet 16 therebetween is of a substantial area.

Spout 12 is preferably formed of a non-frangible material such as a plastic which may be readily maintained sanitary and which has high resistance to breaking and chipping. A plastic material which has been found to be completely satisfactory for this purpose is high temperature rigid polyethylene. The inner portion 20 of the spout is arranged to extend longitudinally substantially the length of surface 19 of the outlet, and is provided with a radially inner surface 21 frusto-conically complementary to outlet surface 19. Mounted on outlet 16 to extend between surfaces 19 and 21 is the sealing sleeve 14, which is formed of a resiliently yieldable material, such as rubber. Sleeve 14 is preferably frusto-conical and complementary to surfaces 19 and 21.

The radially outer surface 22 of inner spout portion 20 is cylindrical, the generatrix being parallel to the axis of portion 20, providing a rigid, wedge shaped transverse cross section to spout portion 20.

The longitudinally outer portion 23 of spout 12 is flared to define a liquid pouring lip 24. The upper rim 25 of outer portion 23 extends in a plane inclined to a plane perpendicular to the axis of spout 12, lip 24 comprising the greatest longitudinal extension of outer portion 23.

Between inner portion 20 and outer portion 23, the spout is provided with a mid-portion 33 having a radially outer frusto-conical surface 26 generally radially aligned with outer end 18 of outlet 16.

Retaining ring 13 comprises a cylindrical clamping element preferably in the form of a split ring having a pair of flat end portions 27 drawn together by means of a suitable screw means 28 to constrict the ring snugly about spout 12 and outlet 16. As discussed above, retaining ring 13 may also serve to connect the handle 15 to the decanter, and for this purpose the handle is provided with a block end 29 clampedly secured between ring end portions 27 also by screw means 28.

The engagement of retaining ring 13 with spout 12 is by an outer inturned end 30 of the ring which engages frusto-conical surface 26 of the spout. The engagement of retaining ring 13 with outlet 16 is by an inner inturned end 31 of the ring which engages the outlet under bead 17. As best seen in Fig. 3, bead 17 precludes the movement of ring 13 longitudinally outwardly, thereby maintaining end 30 of the ring against outward movement, whereby end 30, engaging frusto-conical surface 26, precludes longitudinally outward movement of spout 12. Spout 12 is retained against longitudinally inward movement by its abutment with sleeve 14 and thus pouring means 10 is firmly and sealingly secured to outlet 16 with an effectively minimized radial constrictive force of ring 13.

Due to manufacturing tolerances in the radii of outlets 16 of different vessels it is desirable to adjust the position of the engagement of end 30 with surface 26 of the spout to correspond to the radial position of the engagement of the end 31 of the ring with the outlet 16. To effect this adjustment automatically, surface 26 is arranged to extend parallel to surfaces 21 of the spout and 19 of the outlet. Thus, should the outlet be one having a radius larger than the desired nominal radius, end 31 of the ring would engage the spout at a radially increased distance. However, as the radius of the entire outlet is so increased, inner portion 20 of the spout would extend longitudinally over a lesser portion of surface 19 and frusto-conical surface 26 would be displaced longitudinally upwardly from the position of Fig. 3. Resultingly, end 30 of the retaining ring would engage surface 26 nearer its base and thus at the same enlarged radius as the now enlarged portion of outlet 16 which end 31 engages.

Conversely, should the specific outlet 16 be one having a smaller radius, spout portion 20 is inserted more fully onto outlet 16 whereby a smaller-radius portion of surface 26, corresponding to the smaller radius portion of outlet 16 which is engaged by inner end 31, would be in engagement with end 30. Thus, cylindrical sealing ring 13 is maintained parallel to the axis of the ring thereby assuring proper and uniform retaining engagement of ends 30 and 31 with surface 26 and outlet 16 respectively.

The installation of pouring means 10 is extremely simple. Sealing sleeve 14 is placed over outlet 16 into facial engagement with surface 19 thereof. Inner spout portion 20 is placed over sealing sleeve 14 with inner frusto-conical surface 21 of the spout facially engaging the sealing sleeve. As discussed above, the longitudinal positioning of the spout is automatically correct for the proper relationship of outer frusto-conical surface 26 thereof with the retaining ring. The retaining ring is then place around outlet 16 with inturned end 30 engaging frusto-conical surface 26 and inner inturned end 31 engaging the outlet under bead 17. Block end 29 of handle 15 is inserted between ends 27 of the retaining ring and screw means 28 is tightened to secure the retaining ring around the spout and outlet and fixedly associate handle 15 therewith. It is not necessary to apply a great deal of constrictive force to retaining ring 13 as the retention of pouring means 10 is effected to a substantial degree by the longitudinal retaining action of bead 17. During the constricting operation, retaining ring 13 is maintained cylindrical as a result of the equalization of the radial engagements of ends 30 and 31 to the spout and outlet respectively. Thus no undue twisting deformations are produced in the retaining ring and the pouring means is held positively in proper longitudinal position on the vessel outlet 16.

Due to the non-frangible nature of the material from which spout 12 is constructed, the chipping and breaking common in the known decanters utilizing glass pouring spouts is eliminated. Thus, pouring means 10 may have a substantially indefinite life. If for any reason, however, it is desired to remove pouring means 10 from vessel 11, this may be accomplished readily and simply by releasing screw means 28 so as to allow removal of retaining ring 13. Spout 12 and sealing sleeve 14 may then be removed by simple longitudinal withdrawal from outlet 16.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Liquid pouring means for use with a vessel provided with a frusto-conical, upwardly narrowing outlet having an external annular bead spaced below the outer upper end thereof, comprising: an annular spout formed of a non-frangible material having a longitudinally inner portion and a longitudinally outer portion, said inner portion being sealingly mountable on the outlet between the outer end and annular bead thereof, the radially inner surface of said inner portion being complementary to the frusto-conical outlet, said outer portion defining a liquid pouring lip, said spout further having a mid-portion between said inner and outer portions provided with a radially outer frusto-conical surface narrowing toward said outer portion coaxially of said radially inner surface of the spout inner portion; and a retaining ring generally radially outwardly of the inner portion of the spout and the annular bead of the vessel outlet and having a longitudinally inner inturned end engaging the underside of said annular bead to preclude movement of the ring longitudinally outwardly, and an outer inturned end extending into engagement with said radially outer frusto-conical surface of the spout mid-portion to preclude movement of the spout longitudinally outwardly.

2. The liquid pouring means of claim 1 wherein the longitudinally inner portion of the spout is exteriorly cylindrical and has a diameter less than the internal diameter of the confronting portion of the retaining ring.

3. The liquid pouring means of claim 1 further including a frusto-conical sealing sleeve extending downwardly from adjacent the upper end of the outlet concentrically between said outlet and said radially inner surface of the inner portion of the spout.

References Cited in the file of this patent

UNITED STATES PATENTS

| | | |
|---|---|---|
| 2,664,811 | Jepson | Jan. 5, 1954 |
| 2,807,944 | Glass | Oct. 1, 1957 |